United States Patent
Farel et al.

(10) Patent No.: US 7,035,766 B1
(45) Date of Patent: *Apr. 25, 2006

(54) SYSTEM AND METHOD FOR DIAGNOSING COMPUTER SYSTEM OPERATIONAL BEHAVIOR

(75) Inventors: Richard Alan Farel, Englishtown, NJ (US); Kenichi Futumura, Middletown, NJ (US); Mehdi Hosseini-Nasab, Tinton Falls, NJ (US); Anestis Karasaridis, Middletown, NJ (US); William J. Leighton, III, Scotch Plains, NJ (US); Varsha Arvind Mainkar, Holmdel, NJ (US); Kathleen S. Meier-Hellstern, Cranbury, NJ (US); Paul Kevin Reeser, Red Bank, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/846,293

(22) Filed: May 14, 2004

Related U.S. Application Data

(63) Continuation of application No. 10/011,067, filed on Dec. 3, 2001, now Pat. No. 6,792,393.

(51) Int. Cl.
*G06F 12/04* (2006.01)

(52) U.S. Cl. ...................... 702/183; 702/182; 702/186; 702/188

(58) Field of Classification Search .................. 702/73, 702/86, 122, 179, 182, 186; 435/6; 700/28; 705/51; 709/219; 714/49
See application file for complete search history.

(56) References Cited

U.S. PATENT DOCUMENTS

| 6,014,651 A | * | 1/2000 | Crawford | 705/400 |
| 6,502,213 B1 | * | 12/2002 | Bowman-Amuah | 714/49 |
| 2003/0109951 A1 | * | 6/2003 | Hsiung et al. | 700/108 |

* cited by examiner

*Primary Examiner*—Marc S. Hoff
*Assistant Examiner*—Felix Suarez

(57) ABSTRACT

A system and method for identifying computer system performance signatures and for identifying the cause of undesirable performance signatures, particularly with respect to both application-based and computer system-based parameters. Respective parametric information data is matched with corresponding parameters found in a stored plurality of reference signatures. If a match is found between the behavior of a computer system under study and a reference signature, the present invention provides information about the cause(s) of the reference signature, such that appropriate remedial measures can be taken. If a match is not found (according to predetermined matching rules), then the present invention may provide additional prompts to request additional information or test data such that the signature of computer system being tested can be further refined so that the signature of the target computer system might more closely match a reference signature.

2 Claims, 11 Drawing Sheets

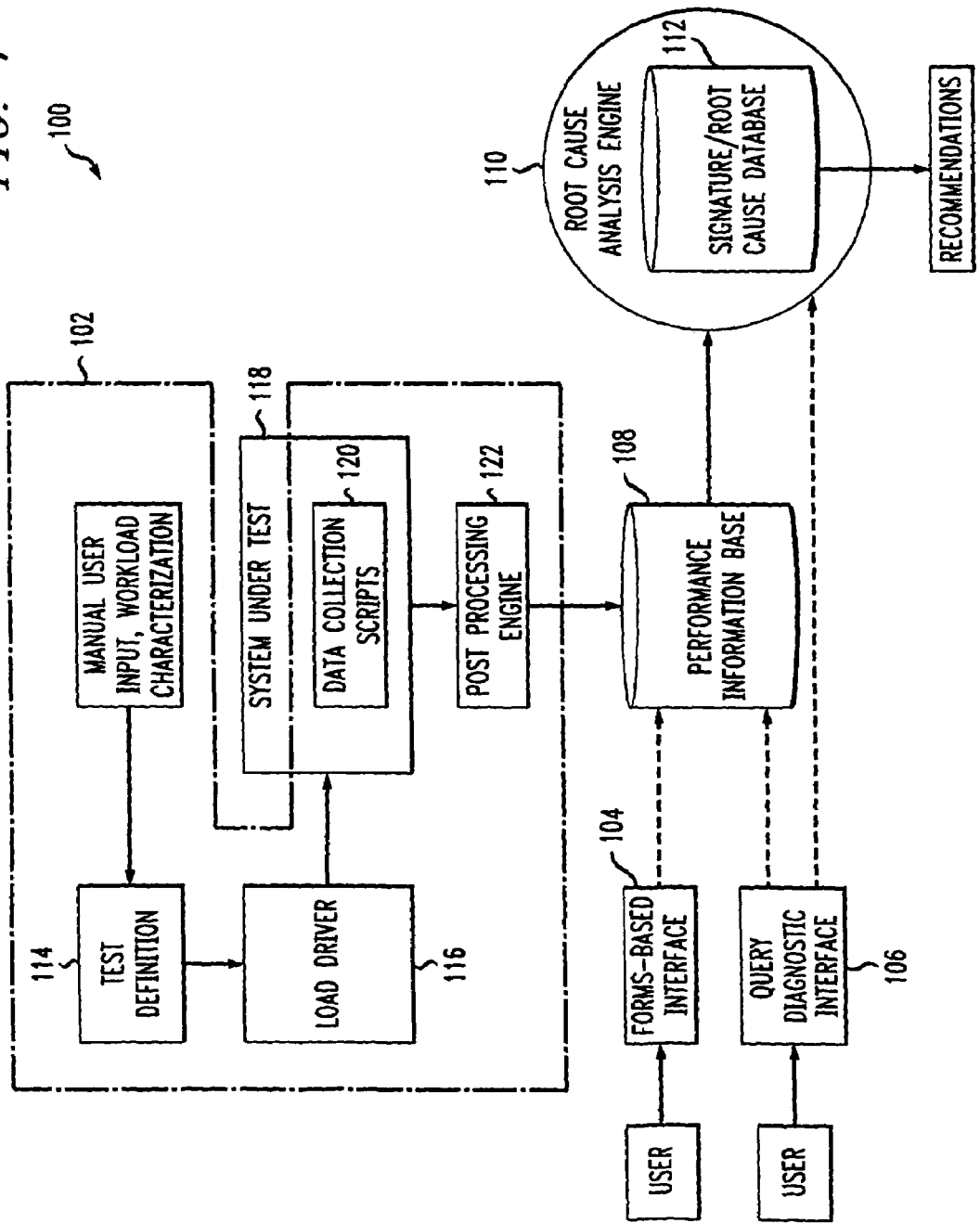

FIG. 3(a)

| | AVG | MAX (T) | MAX (P) | PATTRN | MEASURE | VALUE | MEASURE | VALUE | MEASURE | VALUE |
|---|---|---|---|---|---|---|---|---|---|---|
| % CPU | 85% | 95% | 65% | 0 | # RUN QUEUE | 4 | MAX PER-PROCESS UTIL | 1 | (Y/N) | n |
| % SYS | 25% | 30% | | (1,2,4) | # BLOCKED PROCESSES | 4 | NUMBER OF OPEN SOCKETS | 2 | CPU MS PER TRANSACTION DECREASES WITH INCREASING LOAD ? (Y/N) | n |
| % WIO | 10% | 15% | | | % CONNECTIONS REFUSED | 5% | NUMBER OF THREADS | 1 | %cpu*#CPU's CLOSE TO INTEGER FOR MAJORITY OF TEST ? (Y/N) | n |

FIG. 3(b)

Measurement ID: %CPU:usr+sys ▼

Value: 99   Descriptor: ▼   Pattern: ▼

Measurement ID: cpu real time per transaction ▼

| %wait IO |
| %disk busy |
| semaphore spin rate |
| %wcache |
| %rcache |
| context switch rate |
| application response time |
| max per process %CPU |
| cpu real time per transaction |
| %usr |
| %sys |

Value:   decrease with increasing load ▼

Measurement ID:

Value: ▼

Measurement ID:

FIG. 3(C)

```
Performance Signature Form Interface - Netscape
File Edit View Go Bookmarks Option Directory Window Help
```

*Measurements from a single test*

Test Duration: [_____] Seconds

Number of Users: [_____]

Transaction Arrival Rate: [_____] Transaction per second

<u>User Measure</u>

Throughput [_____] transaction per second

<u>*Pattern:*</u> ○ Detect automatically. Or specify:

○ Throughput oscillates between [__] for [__] seconds and [__] for [__] seconds.

○ Increases then steadies. This happens after [_____] seconds of run time.

○ Increases then decreases. This happens after [_____] seconds of run time.

CPU:

Number of processors: [_____]    Speed: [_____] Mhz

Average CPU utilization (usr+sys): [_____] %

%usr [_____]    %sys [_____]    %io [_____]

FIG. 4

| CLEAR | | FIXED TEST SCORE | | | | | |
|---|---|---|---|---|---|---|---|
| CPU SCORE | 3.00 | APPLICATION SCORE | 1.65 | DISK SCORE | 4.00 | MEMORY SCORE | 3.00 |
| CPU OBSERVATIONS | SCORE | APPLICATION OBSERVATIONS | SCORE | DISKS OBSERVATIONS | SCORE | MEMORY OBSERVATIONS | SCORE |
| POSSIBLE CPU PROBLEM | 3 | ONE PROCESS DOMINATES THE CPU – CHECK FOR RUNAWAY PROCESS | 5 | WATCH DISK SUBSYSTEM FOR BOTTLENECK | 4 | CHECK FOR MEMORY LEAK OR LARGE PROCESSES, MAY NEED TO ADD RAM | 3 |
| | | HIGH SYSTEM CALL ACTIVITY | 4 | DISK RESPONSE TIMES ACCEPTABLE | 5 | | |
| | | MANY PROCESSES – CONSIDER MORE CPUs | 4 | | | | |

SYSTEM AND METHOD FOR DIAGNOSING COMPUTER SYSTEM OPERATIONAL BEHAVIOR

This non-provisional application is a continuation and claims the benefit of U.S. application Ser. No. 10/011,067, now U.S. Pat. No. 6,792,393 entitled SYSTEM AND METHOD FOR DIAGNOSING COMPUTER SYSTEM OPERATIONAL BEHAVIOR, filed Dec. 3, 2001.

FIELD OF THE INVENTION

The present invention relates, generally, to a system and method for diagnosing the operational behavior of a computer system, especially, but not only, those running Internet applications and telecommunication applications. In particular, the present invention relates to diagnosing computer system operational behavior in terms of both application-level operation and system-level operation.

BACKGROUND OF THE INVENTION

In many computer systems, pre-production testing of computer systems, including application-specific computer systems like web servers, is critical to avoiding unexpected and expensive operational problems once the computer systems are deployed and relied upon. General areas of concern include processing bottlenecks and resource use problems (for example, memory and CPU usage). In particular, systems with varying loads (i.e., levels of use) or long-term load carrying may be susceptible to operational problems at higher loads or after operation for long periods of time, although such problems may not be evident in small-scale pre-production testing. A particular, although not exclusive, example of this concept is recognizable in web servers, where the loads on a web server (for example, client-sent file requests) may vary widely according to the number of users accessing the server. Also, extended periods of high server loads may occur (for example, on an e-commerce web server during a peak shopping period).

Conventional computer system testing systems are known for assessing computer system operation. However, conventional testing systems usually perform only a few functions, and do not provide a comprehensive diagnostic package.

For example, load test tools such as LoadRunner® are commercially available from Mercury Interactive of Sunnyvale, Calif. The LoadRunner® test tool is software-implemented and provides a mechanism for running load testing, collecting results, and reporting the collected results. However, it does not select or otherwise help to select specific parametric information to be collected or specific tests to be run. The computer system parameters measured are usually predetermined and not user-selectable. Thus, a system engineer or the like must be able to recognize which test data are of significance.

Similarly, conventional software-implemented application data collection tools are available, for example, from Keynote Systems Inc. However, the Keynote tool is limited to testing/monitoring web sites by deploying agents worldwide that test the client-level experience with respect to a given web site. The Keynote tool only measures user-level response times and throughput, and user-level errors (such as http error codes). It does not monitor a computer system at the server level, nor does it provide any diagnostic functionality. A user must independently decide what tests should be run and must interpret the results.

SE Toolkit is a conventional freeware performance analysis package. SE Toolkit provides system-level diagnosis tools but does not analyze user-experience parameters at an application level. Its primary focus is the computer system—specifically, operating system resource parameters. Analysis of the system parameters is limited to flagging system parameters whose values exceed predetermined thresholds. Some problem-solving functionality is provided, but it is limited to relatively simple problems corresponding to measurement of a single parameter. SE Toolkit provides a language interpreter for creating or editing measurement rules.

Quest Software, Inc. of Irvine, Calif. offers a software package called Spotlight™ that graphically displays server processes and data flow in real time. However, a user must identify congestion and bottleneck problems and decide what action to take. Spotlight™ is application-specific, so a given version of Spotlight™ is limited to analyzing server activity when running a specific application.

Quest also offers a software package called Foglight™ for monitoring application-wise use of system resources. In a particular embodiment, specific software "cartridges" are provided for specific applications to be monitored. Thus, general monitoring of applications with the Quest cartridges is not possible.

SUMMARY OF THE INVENTION

In contrast to the foregoing, the present invention relates to a diagnostic system for a computer system and a method for diagnosing computer system operation. An integrated treatment of both application-level and system-level operation with respect to a plurality of operational parameters is provided. As a result, the present invention can, for example and without limitation, identify performance problems, identify causes of the performance problems, make recommendations for overcoming performance bottlenecks, and provide some form of an index or relative score indicative of each operational parameter that has been examined. The present invention also can analyze the scalability of a computer system.

The present invention uses one or more of load and no-load test runs, time dependent data (such as soak testing), and empirically obtained information (such as field performance data). The input data may be either numerical parametric information or it may be qualitative descriptions of operational behavior that may be internally reduced to quantitative values.

Generally, the present invention includes a method of analyzing the behavior of a computing system. The term "behavior" may sometimes be used interchangeably with the term "signature" herein. The method includes identifying an undesirable computing system behavior and identifying its cause. Thereafter, the method includes recommending at least one of an application-based solution and a system-based solution to remedy the undesirable computing system behavior.

By developing a systematic, reusable approach to analyzing performance and scalability, the present invention significantly reduces the amount of time and resources required to gather and analyze the necessary performance data. The invention can be used effectively for any transaction-based application or operations support system. Examples of transaction-based applications include but are not limited to electronic mail, web servers, instant messaging, directory engines, web search engines, and single sign-on engines. Examples of operations support system applications include but are not limited to provisioning, trouble management systems, data reporting systems, and database information retrieval. The invention does not require a user to know software details of the application. In fact, the internal details of software are often hidden from users, so the invention assesses performance and scalability through empirical methods. The invention is particularly useful for applications that involve database access or applications that are coded using C, C++, Java or Corba, although it is not limited in scope to these applications. These advanced technologies are often used to facilitate rapid development and maintainability, sometimes at the expense of performance and scalability. Ideally the invention should be utilized during the performance testing cycle (before deployment) but it can also be utilized by applications that are already in the field.

In an example of a method according to the present invention, analyzing computer system performance may include applying a test sequence to a computer system running an application, collecting test results from the test sequence that reflect computer system performance, and identifying a characteristic computer system behavior based on the collected test results. On the basis of the identified computer system behavior, the method calls for either matching the identified computer system behavior with a reference computer system behavior having a known cause or, if the identified computer system behavior does not match a reference computer system behavior, recommending further action to obtain additional information usable to refine the identification of the characteristic computer system behavior. A computer-readable medium having computer-executable instructions for carrying out this method may also be provided.

In conjunction with the foregoing, the present invention also relates to a method for obtaining information for use in a computer diagnostic system. Such a method includes running one or more of a scalability performance test and a soak performance test on the computer system and extracting resultant parametric information reflecting both application behavior and system behavior during the test(s).

Another method for obtaining information for use in a computer diagnostic system includes posing a first prompt for eliciting a qualitative description from a user of an operational behavior of a computer system, selecting a second prompt for eliciting an additional qualitative description of the operational behavior of the computer system based on the user response to the first response, and posing the second prompt. Eliciting a qualitative description in this manner can be beneficial because computer system behavior can be described in a simple manner, such as describing a graphical representation of CPU utilization ("slowly ramps to a constant level, then suddenly drops to a near-zero level").

A diagnostic system according to the present invention includes at least one input interface for receiving parametric information about a computer system, an information processing unit that receives and processes the parametric information from the at least one input interface, and an analysis engine that compares the processed parametric information with a plurality of reference computer system behaviors so that a specific behavior of the computer system can be identified and so that a solution to overcome the identified computer system behavior can be provided.

The present invention can be arranged as a client-server network, including a client for receiving parametric application-level and system-level performance information about a computer system, and a server for analyzing the parametric performance information received from the client and identifying an undesirable computer system behavior based on the parametric performance information, whereby the server is at least occasionally connected to said client.

BRIEF DESCRIPTION OF THE DRAWINGS

The present invention can be even better understood with reference to the attached figures, in which:

FIG. 1 is a schematic representation of a system by which computer system behaviors can be identified (i.e., diagnosed) and solution(s) thereto can be found;

FIGS. 2(*c*) and 2(*d*) are graphical representations of characteristic computer system behaviors representing, together, a second signature;

FIG. 2(*e*) is a graphical representation of a characteristic computer system behavior representing a third signature;

FIGS. 2(*f*) and 2(*g*) are graphical representations of characteristic computer system behaviors representing, together, a fourth signature;

FIGS. 3(*a*)–3(*c*) illustrate examples of how parametric information about computer system operation can be input into the system schematically illustrated in FIG. 2;

FIG. 4 is an example of a display indicating the results of root cause analysis and computer system "scoring" by which various aspects of computer system operation can be quantified;

DETAILED DESCRIPTION OF THE PRESENT INVENTION

Figure 2A:
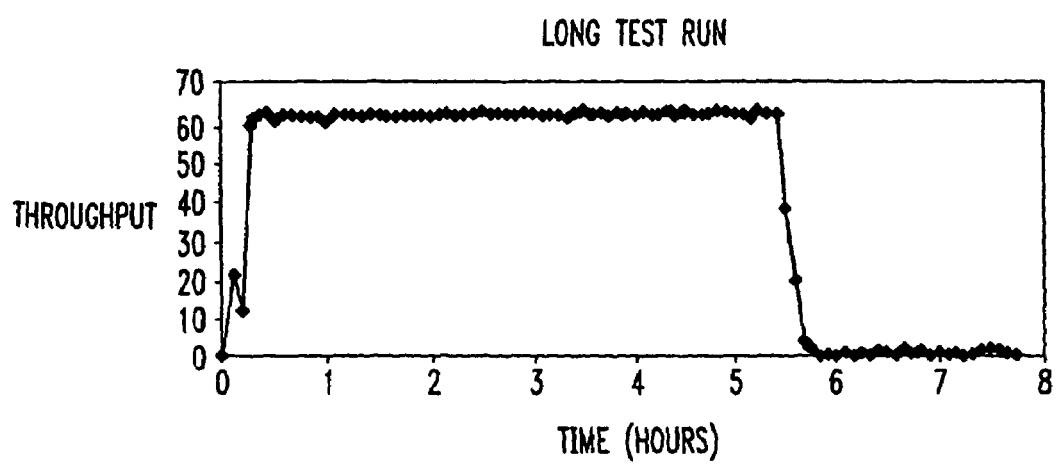
FIGS. 2(*a*) and 2(*b*) are graphical representations of characteristic computer system behaviors representing, together, a first signature.
Figure 2B:
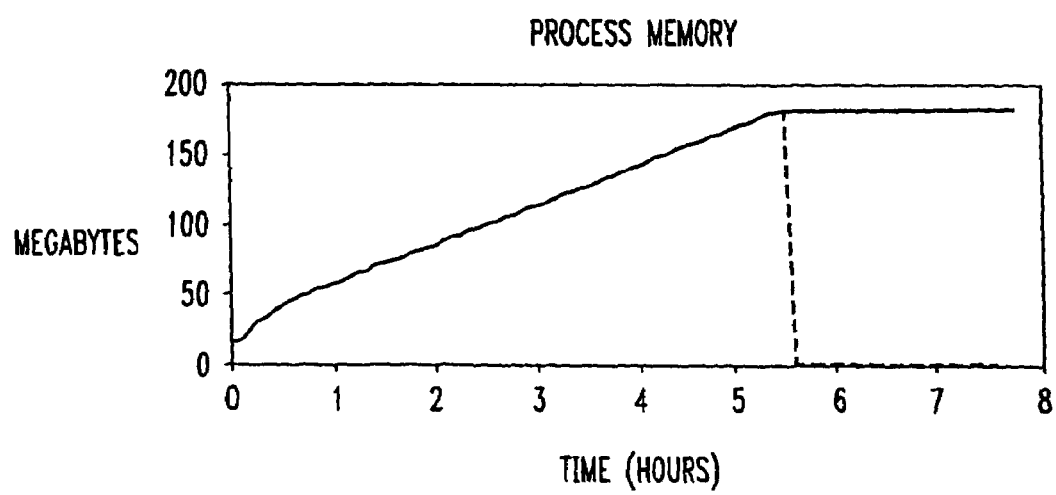
Figure 2C:
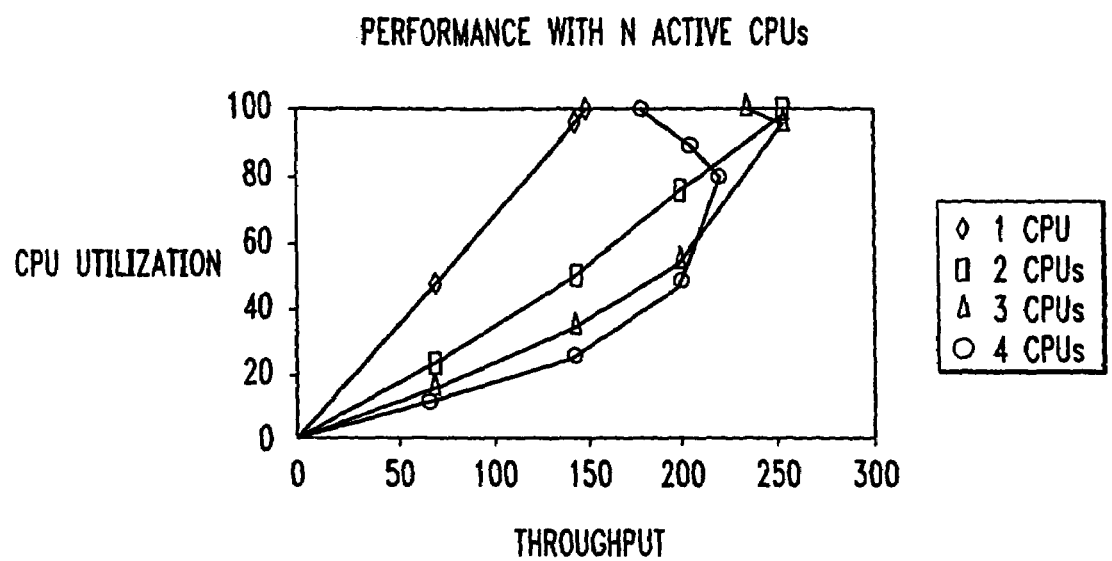
Figure 2D:
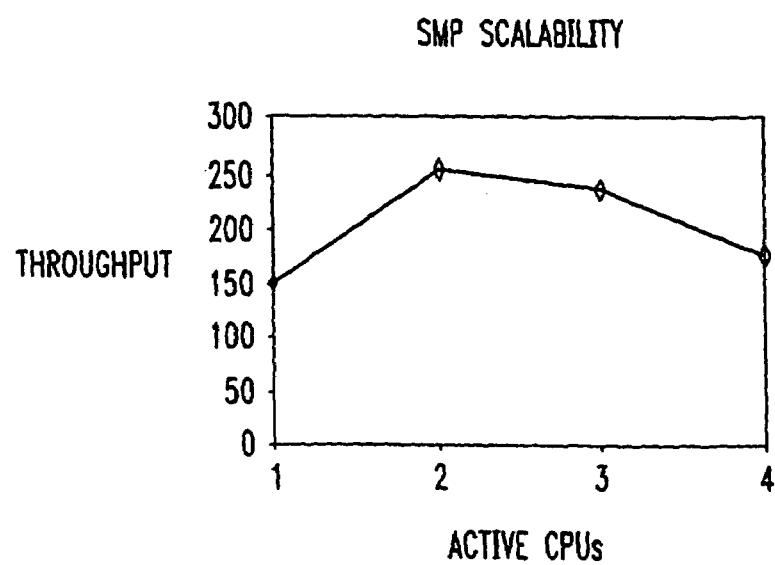
Figure 2E:
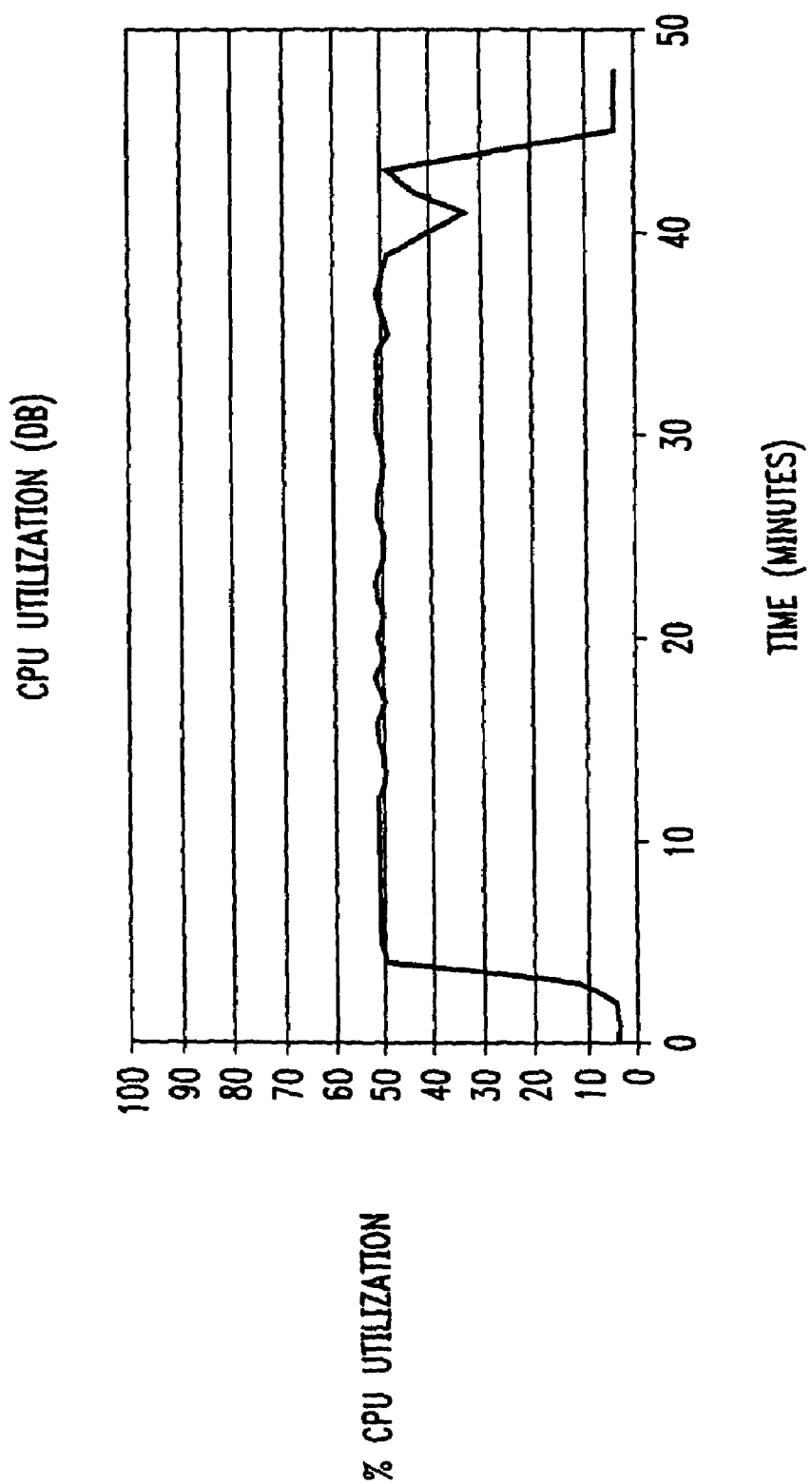
Figure 2F:
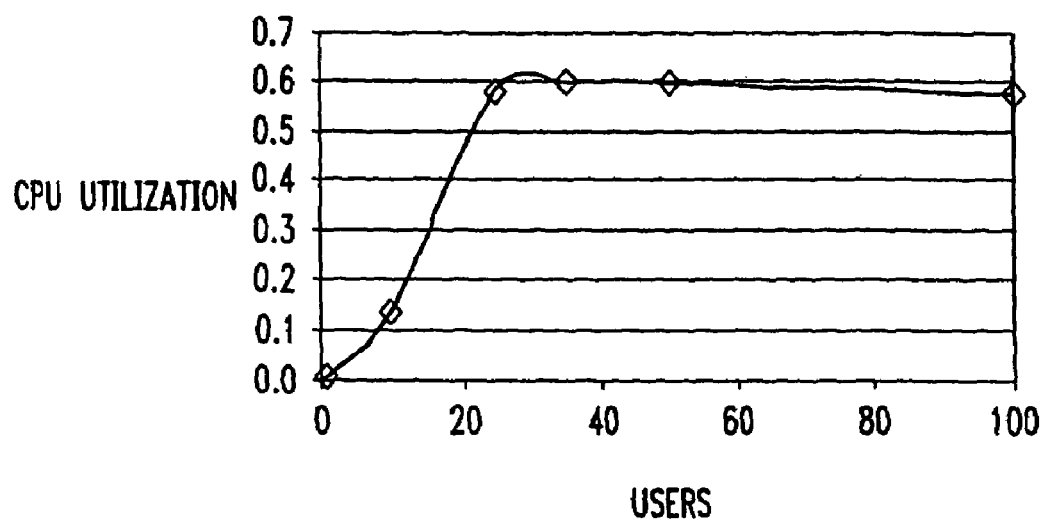
Figure 2G:
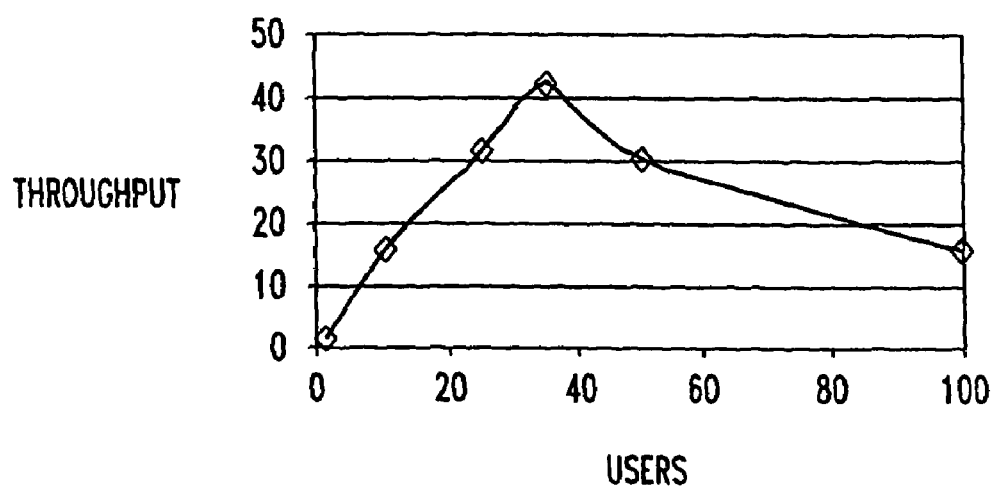

Computer system "signatures" are characteristic and repeatable system behaviors that occur in response to specific operational conditions. Signatures, by definition, also occur in response to specific performance testing conditions which simulate actual operational conditions. Performance testing may include, without limitation, load testing (where one or more operations or transactions are run on the system at a prespecified rate to verify system operability and/or capacity), no-load testing (with no transactions at all or with a single transaction that is performed sequentially), soak testing (where operations or transactions are repeatedly run on the system over long periods of time, such as days), and scalability testing (where the number of simultaneous operations/transactions being executed varies).

Signatures may be dependent on a single operational parameter, for example and without limitation, CPU usage. However, signatures may also depend on more than one parameter and/or a parameter that is interrelated with another parameter, such as, without limitation, time, system configuration (e.g., changing the number of CPUs), number of users, or load. In particular, multiple parameters affecting signatures may be a combination of system-level parameters (for example and without limitation, CPU usage, memory usage, etc.) and application-level parameters (for example and without limitation, throughput versus time, etc.).

Because signatures correspond to specific operational conditions, computer system behaviors (as evidenced by their signatures) can be correlated with those operational conditions. Thus, according to the present invention, an assessment can be made that when a computer system behaves like a known signature, the cause of the computer system behavior is at least somewhat related to those cause(s) associated with the known signature. As a result, steps can be taken to address factors causing an undesirable computer system behavior. Such remedial steps may desirably take into account both application-level parameters as well as system-level parameters.

FIG. 2 schematically illustrates a system 100 by which the system behaviors of computer 118 can be identified (i.e., diagnosed) and solution(s) thereto can be found. The modules illustrated in FIG. 2 can each be provided on a stand-alone basis or as a combination of stand-alone modules and groups of modules that are provided together.

A Performance Information Base ("PIB") 108 defines and stores input data needed to make a particular computer system performance and/or scalability assessment. For example, PIB 108 includes detailed information about computer system 118, including, without limitation, number of CPUs present, RAM installed, hard drive capacity, I/O interfaces, etc. PIB 108 also contains information including, without limitation to, resource utilization (e.g., CPU or I/O), delays and throughputs at one or more load points, qualitative attributes about resource utilization (e.g., High, Medium or Low), and summarized data in the form of patterns. The PIB 108 receives information from at least one post-processing engine ("PPE") 122 associated with the computer 118 under test, as well as forms-based input interface 104, and a query diagnostic interface 106. In some cases, however, at least the query diagnostic interface 106 is configured to provide information directly to a root cause analysis engine ("RCA engine") 110, as seen in FIG. 2.

RCA engine 110 uses predefined algorithms to match collected data with known signatures and their empirically determined causes. RCA engine 110 operates to assess system performance and scalability scores at a multi-dimensional level (with respect to, for example, CPU usage, numbers of CPUs present, application performance, disk operation, memory usage, and network throughput).

Figure 5:
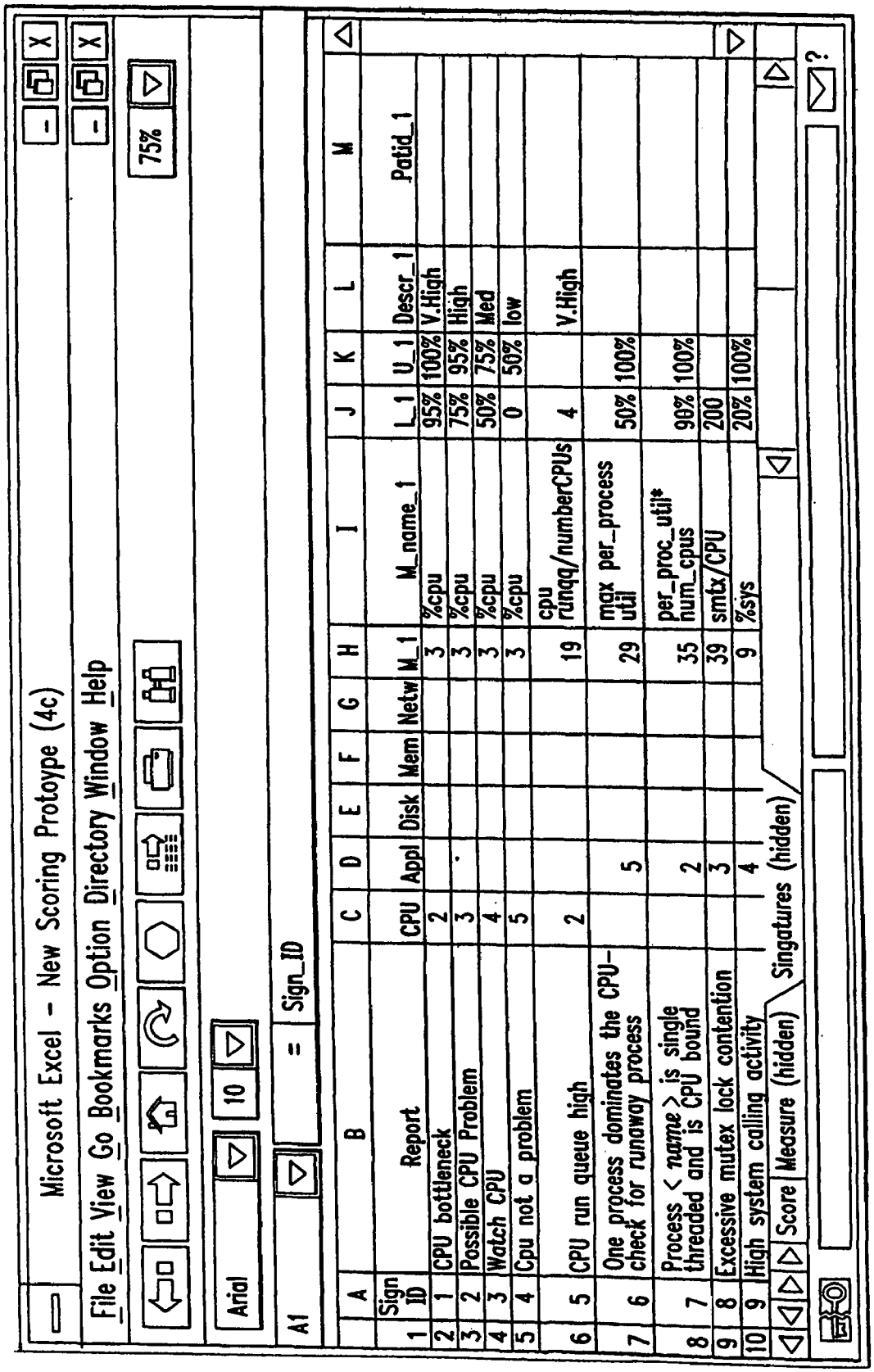
FIG. 5 is an illustrative example of a table that could be used to represent performance signatures, their associated root causes, and a computer system "score " for each root cause.

RCA engine 110 works in conjunction with a performance signature/root cause database ("PSRC database") 112 that stores definitions of known performance signatures, their associated causes and scores for each signature. The definitions of known performance signatures in the PSRC database 112 may include, but are not limited to, a qualitative description of system behavior (e.g., CPU is high, medium, low), measurement thresholds of system performance (e.g., CPU greater than 95%), or thresholds or patterns of measurements that define the signature (e.g., % CPU oscillates between 30% and 70%, throughput increases then drops off. FIG. 5 displays an example of a PSRC database 112. In addition, PSRC database 112 can operate to request/recommend additional tests that can be done or other data that can be input if a signature is not immediately recognized.

The RCA engine 110 compares the collected data in PIB 108 with the known signatures and root causes in PSRC database 112 to assess performance and scalability of the computer system 118 being tested. RCA engine 110 and PSRC database 112 can operate effectively on either all of the data in PIB 108 or on a subset of the data in PIB 108 if only a subset is available, although, as a general rule, more data will lead to better quality assessment.

Figure 6:
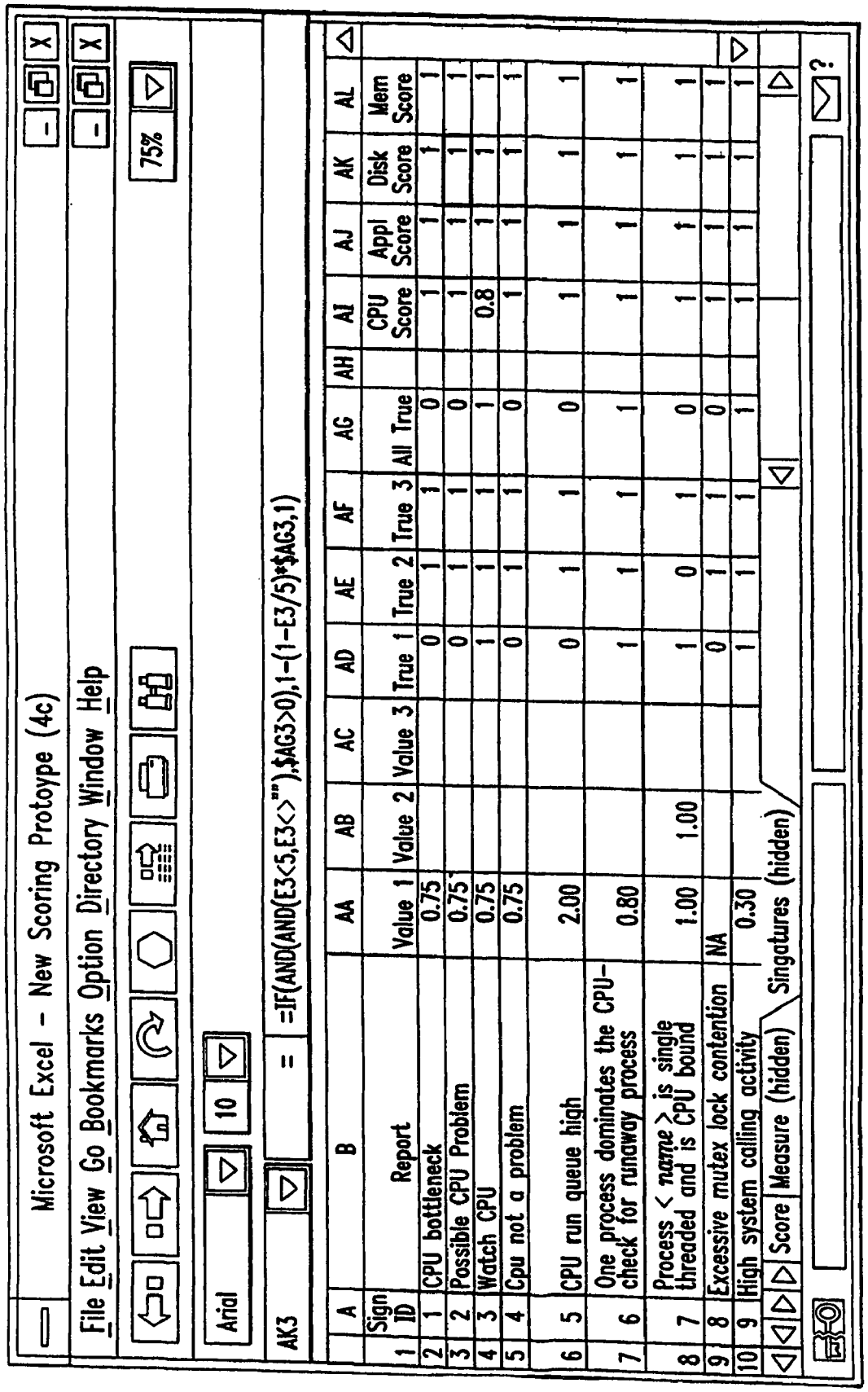
FIG. 6 is an illustrative example of data that may be computed in order to facilitate the operation of the computer system root cause analysis and scoring algorithms.

The algorithms used by the RCA engine 110 allow the PSRC database 112 to be matched with the collected data stored in the PIB 108. Many implementations of matching are possible. In one such implementation of the algorithm, shown in FIG. 6, each collected data element in the PIB 108 is sequentially compared with each signature in the PSRC database 112 in order to determine whether any of the multiple criteria that define the signature are matched or partially matched. After all data elements of the PIB 108 are processed, a determination is made of which signatures are matched along with a score for each signature.

Input interface 102 (denoted by a broken line box in FIG. 2) is a subsystem by which the computer system 118, which may or may not be running an application, can be tested. Input interface 102 may include a test definition module 114 by which a performance test or tests for a given computer system can be defined. The operation of test definition module 114 is important because performance tests that are not appropriately designed can often consume significant resources without providing correspondingly useful information about the computer system being studied. Test definition module 114 provides the user with a comprehensive set of test cases for the computer system being studied, each designed to obtain measurements required to populate the performance information base ("PIB") 108 (which is described further below).

The primary function of test definition module 114 is to use the user's input as a basis on which to select a set of test cases to be executed on the computer system 118. These test cases are defined based on the user's definition of the given computer system's atomic transaction structure (i.e., the individual key transactions of the computer system) and on the user's definition of the operational profile of the computer system (i.e., the combinations of atomic transactions that represent realistic loads of the system). When using atomic transactions as a basis for performance testing, the objective is to identify performance signatures of the computer system under various loads of individual/atomic transactions. In performance testing using operational profiles, the performance of the system is evaluated under loads that to some degree resemble the operational profile of the production environment. Ideally, systematic performance testing according to the present invention integrates the results of both types of testing to develop a comprehensive signature profile that describes the performance of the system under a variety of transaction types and operational profiles.

The test definition module 114 can recommend different categories of performance tests designed for a comprehensive performance study of the computer system 118. In particular, if the user supplies all the necessary information about the computer system 118, then test definition module 114 will provide the user with specifications for test cases to be run.

For example, in a no-load test, the computer system 118 is studied under no load (i.e., with no users). The objective is to baseline the performance of the system in the absence of external interactions. In soak/saturation tests, the load on the system is gradually increased up to a maximum level and the test is run for a long period of time (usually, but not always, days).

Multiple test suites include stress tests and load tests. For example, in stress testing, a load is generated by the equivalent of a number of concurrent users. As soon as a user receives a response, it immediately submits the next request (with negligible client delay). Each of the simulated users does so independently and in parallel. Tests are run with increasing numbers of users until the system is saturated. Stress tests can be done using atomic transactions as well as complex operational profiles.

On the other hand, load testing evaluates and models the performance of various system components under different controlled levels of load. The number of concurrent users may be fixed at a predefined number (with each user generating load at a prescribed rate) or may vary according to the load (i.e., a new "user" may be spawned at each arrival epoch). In these tests, the timing of the transactions and the sleep times between consecutive transactions are designed to mimic actual users' behaviors. Load tests can be done using atomic transactions as well as complex operational profiles.

If the user is unable to supply all the input requested by test definition module 114, then the system according to the present invention will provide the user with the most comprehensive test plan that can be designed based on the available input. In this case, the test plan may or may not include all the above categories. Thus, a user can still obtain meaningful partial results from the test definition module 114 even if some of the input information is missing.

A description of the steps involved in defining test cases is set forth hereinbelow. In each of the following stages, the function of the test definition module 114, the nature of the user's input, and the output of the system are described.

Defining the Operational Profile: First, test definition module 114 provides the user with an interface through which the user can define the individual atomic transactions of the computer system 118 as well as the current or expected operational profile of computer system 118 (i.e., specify the percentage of each defined atomic transaction in the operational profile of computer system 118). The following is an example of information that the user might enter into the test definition module operational profile definition window:

| Transaction No. | Transaction Name | Operation Profile % |
|---|---|---|
| 1 | create order | 50% |
| 2 | update order | 25% |
| 3 | cancel order | 25% |

No-Load Testing: Next, the user is provided with a guideline for conducting a no-load test on the computer system 118. More specifically, the user is provided with the time duration of a suggested no-load test, and specifies the measurements (i.e., the parameters) of computer system behavior that need to be collected and/or the scripts that need to be run during the no-load test. The test definition module 114 also prompts the user to input the results of the no-load test upon completing the execution of the test. Table 1 is an example of the output to the user:

TABLE 1

| Test Type | Duration of Test | Measurements | Scripts |
|---|---|---|---|
| No-Load Test | 1 hour | CPU Utilization, Disk% Busy | NoLoadDefault.sh |

Furthermore, the information included in the above table will automatically be used to populate the Test Type, Test Duration, Measure Types, and Measure Names fields in the data tables of PIB 108.

Stress Testing for Atomic Transactions: Here, the user is first asked to execute a default set of test cases for each defined atomic transaction to provide a baseline for the performance of the system. Table 2 is an example of the system output to the user:

TABLE 2

| Atomic Transaction | No. of Users | Length of Each Test Case | Measurements | Scripts |
|---|---|---|---|---|
| Create Order | 1, 10, 100 | The larger of 100 iterations/user or 15 min. | CPU Utilization, Disk% Busy | AtomicStressDefault.sh |
| Update Order | 1, 5, 50 | The larger of 100 iterations/user or 15 min. | CPU Utilization, Disk% Busy | AtomicStressDefault.sh |
| Cancel Order | 1, 5, 50 | The larger of 100 iterations/user or 15 min. | CPU Utilization, Disk% Busy | AtomicStressDefault.sh |

Furthermore, the information included in the above table will automatically be used to populate the Test Type, Test Duration, Variable, Value of Variable, Number of Users, Transaction Request Rate, Measure Types, and Measure Names fields in the data tables of PIB 108.

The user is then asked to input the results. The objective of this initial step is for the system to determine the load range that is suitable for stress testing computer system 118. If the already-collected results from the baseline test cases satisfy the requirements for defining customized stress test cases for the system 118, then the system will do so. Table 3 is an example of the output defining the tests for determining appropriate load ranges:

TABLE 3

| Atomic | No. of Users | Length of Each Test | Measurements | Scripts |
|---|---|---|---|---|
| Create Order | 10, 20, 30, 40, 50, 60, 70, 80, 90, 100 | 100 iterations/user | CPU, Memory, Disk, Network, Response Time | AtomicStressCustom.sh |
| Update Order | 5, 10, 15, 20, 25, 30, 35, 40, 45, 50 | 100 iterations/user | CPU Memory, Disk, Network, Response Time | AtomicStressCustom.sh |
| Cancel Order | 5, 10, 15, 20, 25, 30, 35, 40, 45, 50 | 100 iterations/user | CPU Memory, Disk, Network, Response Time | AtomicStressCustom.sh |

Furthermore, the information included in table 3 will automatically be used to populate the Test Type, Test Duration, Variable, Value of Variable, Number of Users, Transaction Request Rate, Measure Types, and Measure Names fields in the data tables of PIB 108.

If the collected results from the baseline test case are insufficient for identifying the appropriate load range for stress testing, then the user is asked to run another set of baseline tests until the system is able to determine the load range for stress testing.

Stress Testing for Combinations of Transactions: In this step, the process described with respect to stress testing for atomic transactions is repeated, but this time for combinations of different transactions. In particular, the user is first provided with a default set of test cases to baseline the performance of computer system 118. Upon identifying the appropriate load range, the user is provided with a customized set of stress test cases that reflect the operational profile. Table 4 is an example of the output to the user:

TABLE 4

| (Create Order, Update Order, Cancel Order) | (20, 10, 10), (40, 20, 20), (60, 30, 30), (80, 40, 40), (100, 50, 50) | 2 Hours | CPU, Memory, Disk, Network, Response Time | ProfileStress Custom.sh |
|---|---|---|---|---|

Furthermore, the information included in table 4 will automatically be used to populate the Test Type, Test Duration, Variable, Value of variable, Number of Users, Measure Types, and Measure Names fields in the data tables of PIB 108.

If the collected results from the baseline test case are insufficient for identifying the appropriate load range for stress testing, then the user is asked to run another set of baseline tests until the system is able to determine the load range for stress testing.

Load Testing: Next, the user is asked to input the current or expected load of the system in the field or the load requirements of computer system 118. Furthermore, the user is asked a series of questions aimed at determining the current or expected load on computer system 118 in the field, the load requirements of computer system 118, and user behaviors in the field. For example, the user may indicate that computer system 118 must support up to 100 concurrent users and that users have an average of 30 seconds of think time between each two consecutive transactions. Test definition module 114 will then provide the user with a series of load tests that are custom-designed based on the user's answers and the previously defined operational profile. Table 5 is an example of the resultant output to the user:

TABLE 5

| Transaction Combination | No. of Users | Sleep Time | Length of | Measurements | Scripts |
|---|---|---|---|---|---|
| (Create Order, Update Order, Cancel Order) | (50, 25, 25), (60, 30, 30), (70, 35, 35), (80, 40, 40), (90, 45, 45), (100, 50, 50), (110, 55, 55), (120, 60, 60), (130, 65, 65), (140, 70, 70), (150, 75, 75) | 30 seconds between consecutive iterations | 2 hours | CPU, Memory Disk, Network Response Time | LoadCustom.sh |

Furthermore, the information included in table 5 is automatically used to populate the Test Type, Test Duration, Variable, Value of Variable, Number of Users, Transaction Request Rate, Measure Type, and Measure Name fields in the data tables of PIB 108. Load testing can also be done using atomic transactions through a similar procedure.

Soak Testing: The user is provided with the specifications of a soak test. The soak test is designed to load the system with a steady load that causes approximately 80% CPU utilization. The parameters of the soak test are calculated based on the results of the baseline stress tests (see above). Table 6 is an example of the output from the system:

TABLE 6

| Transaction Combination | Max No. of Users | Sleep Time | Length of Soak Test | Measurements | Scripts |
|---|---|---|---|---|---|
| (Create Order, Update Order, Cancel Order) | (140, 70, 70) | 30 seconds between consecutive iterations | 48 Hours | CPU, Memory, Disk, Network, Response Time | SoakCustom.sh |

Furthermore, the information included in the above table will automatically be used to populate the Test Type, Test Duration, Number of Users, Transaction Request Rate, Measure Type, and Measure Name fields in the data tables of PIB 108.

In accordance with the present invention, default recommendations may be provided that can be modified based on user input. As a result, if the user cannot provide required information, then the system will rely on the default recommendations.

The set of tests defined by test definition module 114 is relayed to a load driver 116, which converts the test definitions into computer-readable form of a performance test to be performed. The load driver 116 may be specially designed by the user, or a commercially available load test tool, such as the Mercury Interactive Loadrunner® test tool described above, or the Silk Performers package from Segue. The performance test is then run on the computer system 118 being tested, usually but not always while the computer system 118 is running a particular application of interest. As a result, the behavior of the computer system 118 can be studied while the computer system 118 is actually running an application in a "real-life" manner.

The computer system 118 may have a data collection script module 120 loaded therein for automatically capturing parametric information from the computer system 118. The data collection script module 120 includes one or more programs or instruction sets that operate under user control to automatically retrieve and accumulate parametric information from the operating computer system 118. Data collection script module 120 may either be run on computer system 118 or may be a stand-alone module operably located between computer system 118 and post-processing engine ("PPE") 122, acting to convert received inputs into a format understood by PPE 122. Examples of the controls a user may exert on the data collection script module 120 include, without limitation, sample interval, number of samples, test duration, resources to monitor, and log files to monitor.

The data collection scripts may be written in, for example, Unix, and may be implemented as a shell script that invokes commonly available Unix utilities with output redirected to files. Commonly available utilities include, but are not limited to, sar, iostat, mpstat, vmstat, netstat, ps, and nfsstat. For example, to collect measurements on disk performance at 30-second sample intervals for a one-hour measurement period, the script could use the iostat utility in a manner similar to:

iostat–xn 30 120>disk.dat &.

For example, to collect a substantially complete set of data sufficient to run the RCA engine 110 against a predetermined collection of symptoms and root causes at 30-second sample intervals for one hour on a Unix server computer system 118, a script similar to the following could be used:

```
#/bin/sh
invl = 30
len = 3600
iter = $len/$invl

infc = hme0

iostat –xn $invl $iter >disk.dat &
mpstat $invl $iter >cpu.dat &
vmstat $invl $iter >memory.dat &
netstat –i $invl $iter >net_i.dat &

x=$iter
while[$x – gt 0]
do
    ps –ef >>ps.dat
    netstat >>net.dat
    netstat –k $infc >>net_k.dat
    netstat –s >>net_s.dat
    nfsstat –c >>nfs.dat
    sleep $invl
    x = $(($x – 1))
done
```

Alternatively, the data collection script module 120 could be implemented in a program that directly reads kernel data structures.

The post processing engine (PPE) 122 processes the test measurements and produces data summaries, graphs, and qualitative descriptors used in populating PIB 108. PPE 122 reduces the collected measurements in such a way as to facilitate modeling of the results and root cause analysis. PPE 122 includes but is not limited to a set of programs and scripts that reduce and process the collected input measurements according to the requirements of PIB 108 and RCA engine 110.

The input of the PPE 122 is provided by the user either automatically or manually.

Automatic input: After the user has followed the guidelines of test definition module 114 and has run the scripts of data collection script module 120 during the performance testing process, PPE 122 automatically interfaces with data collection script module 120 and receives collected measurements therefrom.

Manual input: After the user has conducted performance tests and collected measurements without using test definition module 114 or data collection script module 120, the collected data is manually fed to PPE 122 by specifying the particulars of the data files (i.e., filename/path, type of measurements, granularity, etc.) being fed. The data files must correspond to the format of the data collection script module 120. Table 7 is an illustration of an example of a manual input table for PPE 122.

TABLE 7

| Measure Type | Measure | Data Collection Tool | Filename |
|---|---|---|---|
| Resource | Disk | iostat | io.dat |
| Resource | CPU | ps -ef | ps.dat |
| User | Response Time | LoadRunner | response.xls |

The output of PPE 122 includes but is not limited to high-level summaries and post-processed measurement files. High-level summaries include but are not limited to averages, maxima, and minima of all the collected data counters. The PPE 122 may also produce summary graphs of performance. Post-processed measurement files include reduced or otherwise manipulated measurements in formats that facilitate importation into the data model. The specifications and formats of these post-processed measurement files are closely related to the root cause analysis algorithms that eventually use these measurements to identify performance issues. In particular, the measurements are reduced, formatted, and organized so as to correspond to the input specifications of PIB 108.

PPE 122 summarizes, consolidates, and processes the collected data from data collection scripts 120, so that the information can be converted to a suitable form for the PIB 108. In a particular example of the present invention, PPE 122 translates the Unix output from data collection scripts 120 into a PIB input format.

Input interfaces 104, 106 are different from input interface 102 in that input interfaces 104, 106 allow a use user to enter data about the behavior of computer system 118 instead of taking information directly from the computer system 118, as described above.

Input interface 104 is, generally, a forms-based interface by which a user can input information about the behavior of computer system 118. One example of a forms-based interface is shown in FIG. 3(*a*), which provides a tabular format for inputting information. Another example is shown in FIG. 3(*b*), using graphical drop-down menus with slide bars along with input boxes. A third example is shown in FIG. 3(*c*) as a web-based form in HTML format. In some examples of the present invention, the parameters and/or possible inputs on a page may vary in accordance with what has been previously selected/entered.

Generally, a user fills out an on-screen form that captures the data required by the PIB. The invention does not specify how the raw performance data responsive to the form are collected. However, the form is set out in a manner that captures input in a form that is usable by PIB 108 and RCA engine 110. Data may be collected from other modules of the invention (one or more of the test definition module 114, the data collection scripts 120, or PPE 122) or may be collected by any other means, and thereafter input via input interface 104. Partial collection of data is effective according to the present invention. In other words, the system will work (to the extent possible), even though all requested data may not be input (e.g., may not be available).

Input interface 106 is a query-based interface that enables a user to input, qualitatively, his observations about system behavior. This is particularly useful if the user is relatively not so sophisticated and has difficulty, for example, differentiating specific system parameters. Most generally, the query-based interface obviates a need to know specific parameter values. Therefore, a user can input his observation of system behavior by selecting a choice that states, for example and solely by way of illustration, "memory usage ramps upward then stays flat." Input interface 106 may either provide input information to PIB 108 (explained further below) or directly to RCA engine 110, as illustrated in FIG. 2. As with input interface 104, results from PPE 122 may be collected and then manually input into PIB 108 or RCA engine 110 using input interface 106, if the information is not provided directly to PIB 108 from PPE 122. Also, partial provision of input data will still allow the system to work, as discussed above with respect to input interface 104.

In a preferred example of the present invention, the query-based interface is interactive and presents a series of prompts that are intended to elicit a complete picture of system behavior from the user. For example, a first prompt may state "describe memory usage with respect to time," to which the user might respond "memory usage ramps upward then stays flat" (as stated above). Thereafter, a second prompt is selected based on the user's answer to the first prompt. Thus, in this example, a second prompt might ask "How fast does the memory usage ramp up?" The system might then provide available responses of, for example, "1–3 MB/hour," "3–6 MB/hour," or "6–9 MB/hour."

However, if the response to the first prompt had been, for example, "memory usage oscillates sinusoidally," the second prompt might then have been, "what is the amplitude of the oscillations?"

The required prompt threads may be predefined as a tree, such that each available response to a given prompt has an associated subsequent prompt. In use, the system may be configured to match a given qualitative response to one or more specific parametric values, or at least a range of specific values.

In an alternative example of the present invention, empirically collected field data (i.e., performance data recorded from actual computer system operation) can be analyzed. As a result, a computer system under study need not be separately operated in connection with testing. Instead, the collected field data is directly analyzed, for example, via PPE 122 and PIB 108, and test definition module 114, load driver 116, and data collection scripts 120 can be omitted.

As part of the analysis of computer system 118, the system 118 as a whole and/or components of the system (for example, CPU, memory, hard disk function, etc.) may be scored in any useful comparative manner so as to provide a gauge of the health of the system and/or its components. As mentioned, the scoring may be of any form, such as, without limitation, relative numerical range scales, visually-perceivable color coding, visually perceivable symbolic coding, etc. In one example illustrated in FIG. 4, several broad categories are each scored (e.g., CPU score, application score, disk score, memory score, network score, etc.), in this case, on a scale of 0–5 with 0 being worst and 5 being best. Each broad category is scored on various subfactors, where each subfactor may correspond to a detected signature. The scores of the subfactors are determined through expert judgement and are combinable to at least partly determine the score for the broad category. For example, under memory score, a subfactor related to a memory leak appears. The subfactors that appear with respect to each broad category may vary. For example, the subfactors that appear may correspond to problems warranting special attention (that is, problems that happen to exist at that given time).

The algorithm for scoring may vary, in part, depending on the form of the scoring provided (for example, numerical versus color-coding versus symbol-coding). A broad category score can be determined from subfactor scores in many ways. For example, if the scores are normalized to lie between 0 and 1, the broad category score could be the minimum of the subfactor scores, the product of subfactor scores, or, more complex, $$\left(\sum ((\text{Subfactor Score})^{-k} - 1) + 1\right)^{-\frac{1}{k}},$$

where k>0. The broad category score should be generated to satisfy desirable behavioral properties. Examples of such properties are, but are not limited to: 1) the broad category score should be less than the minimum of the subfactor scores, 2) the broad category score should lie between the maximum and minimum possible score, and 3) the broad category score should not change if additional subfactor scores are incorporated that are equal to the maximum score. A multiplicity of broad category score algorithms that maintain these and other desirable properties can be constructed. The present invention may be completely software-implemented, preferably, but not necessarily only, as a single application package. In some instances, the present invention may be run on the computer system 118 being analyzed. For this reason, the application is desirably small from a programming standpoint, using minimal system resources.

In another embodiment, the present invention may be run on a computer system separate from computer system 118 being tested. In this case, information about the computer system 118 being tested is transferred to the PIB 108, either manually or via an automated interface. The input interfaces of input interfaces 104 and 106 may, for example, be provided on a user terminal of the computer system.

In another embodiment, input interfaces 104 and/or 106 may be embodied as a client or clients in a client-server network, whereas the core elements of, for example, PIB 108, RCA engine 110, and PSRC database 112 may be embodied in a server on the client-server network. Thus, input interfaces 104 and/or 106 may use web-type graphical user interfaces (using HTML, Java, and the like) to interact with the server. It can be appreciated that this arrangement may make it possible to provide the analysis functions described and claimed herein remotely, such that relevant computer system data is transmitted over a network (such as the Internet, or a WAN or LAN) to a server that performs the relevant testing and/or analysis and returns results to the client(s) over the network. It will be further appreciated that this may permit the analysis functions described herein to be made available as a central service, receiving information from related or unrelated clients. Furthermore, the concept of a centralized server is beneficial to the extent that PSRC 112 can be grown or refined based on empirical information received from a larger pool of sources.

Another advantage of a web-implemented version of the present invention is that it facilitates updating the analysis modules, such as the measures stored in PIB 108 and signatures stored in PSRC database 112, because they are provided at a central server. Furthermore, the system may be made secure by controlling access to the server in known ways.

Below, several working examples illustrating the present invention as described hereinabove and as claimed are set forth.

EXAMPLE 1

Memory leaks are a common software fault in applications written in languages such as C++ in which the programmer is responsible for memory allocation and recovery. Memory gets allocated but, due to a fault in the code, never gets freed. Big, obvious leaks are usually detected (and corrected) early in the software development process. Small, slow leaks sometimes slip through to load test or, worse, production. A memory leak is considered to be fatal if it results in the application crashing or otherwise failing to function.

Fatal memory leaks can be detected using load testing by executing a long soak run (load test that is run for days) with a fixed workload while monitoring application throughput and memory consumption.

RCA engine 110 looks for a pattern similar to that shown in FIGS. 1(*a*) and 1(*b*). The behaviors illustrated in FIGS. 1(*a*) and 1(*b*) together constitute the signature of a fatal memory leak—steady throughput during a long test run accompanied by steady application memory growth, followed by a sharp drop in throughput and no further memory growth. More typically, the application simply crashes. Thus, a memory leak can be identified.

EXAMPLE 2

Web applications are commonly deployed on symmetric multi-processor (SMP) servers. An N-way SMP server is typically cheaper than N 1-way servers. The N-way server is also easier and less costly to administer and operate. A measure of how well an application performs on an SMP server is how close it comes to delivering N times the throughput performance of a single CPU server. Some deviation from strictly linear scaling is common and inevitable, but major deviations can negate the expected cost advantages mentioned above. Flat scalability (i.e., where adding a CPU is associated with no increase in throughput) is understandably undesirable. Negative scalability (i.e., where adding a CPU is associated with a decrease in throughput) is even more undesirable.

Application SMP scalability can be assessed by conducting a series of load tests with different numbers of active CPUs. Each test is run in a series of stages, starting with low load and increasing load at each stage. For Web applications, this is typically accomplished by starting the load test with a small number of "virtual user" load generation agents and relatively long think times between transactions and adding virtual users and/or reducing think times at each stage. Measures (i.e., system parameters) of interest are transaction throughput and CPU utilization.

RCA engine 110 looks for a pattern similar to FIGS. 1(*c*) and 1(*d*). Together, FIGS. 1(*c*) and 1(*d*) constitute a signature of poor SMP scalability—one or more CPU utilization vs. throughput curves that show a rapid increase in CPU utilization with little increase (or even a decrease) in throughput when all or most CPUs are active, accompanied by a sustainable throughput vs. active CPU profile that increases little or actually decreases as the number of CPUs increase. As a result, one can conclude that the system does not effectively scale as CPUs are added, such that the application software should be reworked.

EXAMPLE 3

A configuration error in a multi-processor machine can quickly result in performance degradation. In this example, a database on a multi-processor machine is configured to utilize only a subset of the processors available. This error, not usually evident during normal operation, is detectable during a stress test.

By running a stress test, a failure to utilize all CPU's in a multi-processor machine can be detected by measuring CPU utilization. FIG. 1(*e*) illustrates the signature of a multi-processor machine misconfiguration—constant CPU utilization at a fractional level of the number of CPU's (e.g., 25%, 50% or 75% on a 4-CPU machine). Thus, the multi-processor machine must be reconfigured (according to known practices) to utilize all available CPU's.

EXAMPLE 4

Java-based applications are extremely popular due to their ease-of-programming and faster development times. However, many implementation details, such as code synchronization, are hidden from the developer. If a number of simultaneous users access synchronized code, then requests must queue for the synchronized resources. This creates a software bottleneck and prevents the CPU from being fully utilized. If the code execution time increases with the number of simultaneous users (e.g., a linear search through a table holding information on active users), then performance degrades as concurrency increases.

Software bottlenecks can be uncovered by conducting a series of stress tests with an increasing number of concurrent users. The measures (i.e., system parameters) of interest include CPU utilization, throughput, and average processing time per transaction.

FIG. 2(*f*) and 2(*g*) together constitute a signature of a software serialization bottleneck together with a linear search, where CPU utilization levels off at a value less than 100%, throughput peaks then steadily degrades, and processing time per transaction increases with the number of simultaneous users. Accordingly, the code must be examined and possibly profiled to specifically locate and remove the bottleneck(s).

EXAMPLE 5

This example illustrates one of many signatures associated with a software scalability bottleneck resulting from code serialization in a database application. One of the servers serializes read/write requests' to the disk sub-system, creating an I/O-related choke-point that throttles file system activity and causing significant values for wio (more than a few %). (CPU cycles are attributed to wio only when every request-handling thread is blocked waiting for the return from a disk operation. % wio is the percent of time that the CPU spends in the wio state.)

Database code serialization bottlenecks can be uncovered by conducting a series of stress tests with an increasing number of concurrent users. As soon as a user receives a response, it immediately submits the next request (with negligible client delay). Each of the N simulated users does so independently and in parallel. Hardware (CPU, memory, disk, I/O) resource consumptions are measured via standard Unix tools (mpstat, vmstat, iostat). In addition, end-to-end client response time is measured.

The performance signature of a database code serialization bottleneck consists of:
- Excessive CPU time attributed to the wio state, with relatively low values for usr and sys CPU time; and
- Reasonable levels for disk service times, swap and free pages, paging rates, and process queues; I/O operations, disk queue levels of 0, and number of I/Os in service well below 1.

As a result, RCA engine 110 will recommend analyzing the code to detect where a server serializes read/write requests to the disk sub-system, and modifying the code to remove the serialization.

EXAMPLE 6

Internet applications are frequently used to access back-end databases and may experience database I/O bottlenecks. Symptoms include high disk utilization resulting in processes spending inordinate amounts of time waiting for I/O.

The common wisdom is to add more powerful disk subsystems. However, sometimes the root cause of the problem lies in the database access patterns. In these cases, the problem is to distinguish between when there is a real need for expensive hardware upgrades, or when the problem can be fixed with smarter DB query routing. Specifically, exploiting file-caching mechanisms more efficiently may relieve the bottleneck; then fewer disk reads are required and the overall performance and capacity improve.

This type of bottleneck can be detected during routine load tests with realistic operational profiles that mirror the access patterns in the field and hardware that matches the deployed configuration. The symptoms can be detected by monitoring disk utilization and memory usage (e.g., using iostat, vmstat and ps).

The performance signature for a database I/O bottleneck due to poor use of caching includes high disk utilization, high percent of process time spent in wait for I/O, high page scanner rate, page in rate=free rate, low memory utilization by processes.

Accordingly, the RCA engine 110 may recommend ways to improve the cache hit ratio. This can be done, for example, by increasing RAM size, and reducing the range of the data serviced by each DB server machine.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit or scope of the invention as set forth and defined by the following claims.

What is claimed is:

1. A method of analyzing both application behavior and system behavior in a computing system, the method comprising:
   storing computer system signatures representing characteristic and repeatable computer system behaviors that occur in response to specific operational conditions;
   identifying an undesirable computing system behavior by comparing computing system behavior to the stored computer signatures;
   identifying a cause of the undesirable computing system behavior based on causes corresponding to the stored computer system signatures; and
   requesting additional information about the computing system, after identifying an undesirable computing system behavior and before identifying a cause of the undesirable computing system behavior; and
   recommending at least one of an application-based solution and a system-based solution to remedy the undesirable computing system behavior.

2. The method according to claim 1, wherein requesting additional information comprises recommending a system test to be run on the computing system.

* * * * *